(12) United States Patent
Moerdijk et al.

(10) Patent No.: US 12,497,250 B2
(45) Date of Patent: Dec. 16, 2025

(54) PALLETIZER

(71) Applicant: Solidtec B.V., Dronten (NL)

(72) Inventors: Willem Adriaan Moerdijk, Dronten (NL); Reindert Jan Goetheer, Emmeloord (NL)

(73) Assignee: Solidtec B.V., Dronten (NL)

( * ) Notice: Subject to any disclaimer, the term of this patent is extended or adjusted under 35 U.S.C. 154(b) by 0 days.

(21) Appl. No.: 18/792,646

(22) Filed: Aug. 2, 2024

(65) Prior Publication Data
US 2025/0042677 A1    Feb. 6, 2025

(30) Foreign Application Priority Data
Aug. 4, 2023   (EP) .................................... 23189682

(51) Int. Cl.
*B65G 57/03*      (2006.01)
*B65B 35/44*      (2006.01)
*B65B 35/50*      (2006.01)

(52) U.S. Cl.
CPC ............ *B65G 57/035* (2013.01); *B65B 35/44* (2013.01); *B65B 35/50* (2013.01)

(58) Field of Classification Search
CPC ....... B65B 11/045; B65B 35/50; B65B 5/101; B65B 35/52; B65G 57/06; B65G 57/24;
(Continued)

(56) References Cited

U.S. PATENT DOCUMENTS 2,985,322 A * 5/1961 Parker ................ B65H 31/3063
414/790
3,730,357 A * 5/1973 Beaty, Jr. ............... B65G 57/06
414/788.9
(Continued)

FOREIGN PATENT DOCUMENTS

| CN | 106044244 A | 10/2016 | |
| DE | 102013101137 A1 * | 8/2014 | .......... B65G 57/035 |
| EP | 3699117 A1 | 8/2020 | |
| FR | 2861714 A1 | 5/2006 | |
| FR | 3040375 A1 * | 3/2017 | ............. B65G 57/06 |

* cited by examiner

*Primary Examiner* — Gregory W Adams
(74) *Attorney, Agent, or Firm* — The Webb Law Firm (57) ABSTRACT

A palletizer for stacking cargo, such as bags or boxes, onto a pallet in multiple layers is disclosed. The palletizer includes a main frame extending in vertical direction; pallet lifting means for lifting a pallet, which pallet lifting means are arranged to the main frame and are movable in vertical direction between the base of the main frame and the top of the main frame; a manipulator arranged to the top of the main frame for positioning the cargo and forming a layer on top of a pallet lifted by the pallet lifting means; and a supply main conveyor, such as a belt conveyor, arranged with one end to the top of the main frame for supplying cargo to the manipulator. The manipulator includes a sub-frame movable in a horizontal plane relative to the top of the main frame; a first floor arranged in the sub-frame and a second floor arranged in the sub-frame and above the first floor, wherein each floor has an opening, which can be closed by a door, such as a trap door, and wherein the openings in the floors are aligned when viewed in a vertical direction; and a supply sub conveyor arranged with one end adjacent to the one end of the supply main conveyor and arranged with the other end to the sub-frame and adjacent to the opening in second floor, such that cargo is conveyed on top of the door closing the opening in the second floor. The first floor is rotatable relative to the sub-frame and around a vertical axis.

9 Claims, 6 Drawing Sheets

(58) Field of Classification Search
CPC .......... B65G 57/22; B65G 57/10; B65G 1/08;
B65G 47/244; B65G 57/03; B65G
2201/0238; Y10S 414/116; Y10S 414/114
USPC ............ 414/791.4, 791.6, 791.7, 791.8, 792,
414/788.9, 788.3, 789, 794.2
See application file for complete search history.

(56) References Cited

U.S. PATENT DOCUMENTS

| | | | | | |
|---|---|---|---|---|---|
| 3,921,825 | A | * | 11/1975 | Sheehan | B65G 57/24 414/789.5 |
| 4,015,732 | A | * | 4/1977 | Beaty, Jr. | B65G 59/062 414/902 |
| 5,046,303 | A | * | 9/1991 | Becicka | B65B 35/50 53/540 |
| 5,051,058 | A | * | 9/1991 | Roth | B65G 57/06 414/676 |
| 5,127,212 | A | * | 7/1992 | Johnsen | B65B 35/50 53/540 |
| 5,263,302 | A | * | 11/1993 | Hauers | B65B 35/50 53/244 |
| 5,533,861 | A | * | 7/1996 | Klupfel | B65B 35/40 414/794.2 |
| 5,551,833 | A | * | 9/1996 | Marsh | B65G 57/06 414/794.3 |
| 5,580,599 | A | * | 12/1996 | Fehr | A21C 3/08 198/418.6 |
| 8,002,513 | B2 | * | 8/2011 | Malenke | B65B 25/08 414/793.4 |

PALLETIZER

CROSS-REFERENCE TO RELATED APPLICATION

This application claims priority to European Patent Application Ser. No. 23/189,682.0 filed Aug. 4, 2023, the disclosure of which is hereby incorporated by reference in its entirety.

BACKGROUND OF THE INVENTION

Field of the Invention

The invention relates to a palletizer for stacking cargo, such as bags or boxes, onto a pallet in multiple layers, which palletizer comprises:
- a main frame extending in vertical direction;
- a support surface arranged to the main frame;
- a manipulator arranged to the top of the main frame for positioning the cargo and forming a layer on top of the support surface;
- a supply main conveyor, such as a belt conveyor, arranged with one end to the top of the main frame for supplying cargo to the manipulator;
- wherein the manipulator comprises:
  - a sub-frame movable in a horizontal plane relative to the top of the main frame.

Description of Related Art

Such a palletizer is for example known from CN 106044244.

This publication shows a palletizer in which a squeeze bucket is mounted to the movable sub-frame. The squeeze bucket receives the cargo from supply main conveyor. The sub-frame then moves to a desired position above a pallet and the squeeze bucket is rotated such that the cargo is provided with the correct position for forming a layer on top of the pallet. Then the squeeze bucket releases the cargo, which falls on top of the pallet. The sub-frame together with the squeeze bucket needs to return to the supply main conveyor to pick up the next piece of cargo, after which the sub-frame is positioned again over the pallet and the squeeze bucket is rotated into the desired position.

Because the squeeze bucket and the sub-frame need to move back to a starting position adjacent to the supply main conveyor valuable time is wasted.

SUMMARY OF THE INVENTION

It is an object to reduce or even remove the above mentioned disadvantages.

This object is achieved according the invention with a palletizer according to the preamble, which is characterized in that the manipulator further comprises:
- a first floor arranged in the sub-frame and a second floor arranged in the sub-frame and above the first floor, wherein each floor has an opening, which can be closed by a door, such as a trap door, and wherein the openings in the floors are aligned when viewed in a vertical direction;
- wherein the first floor is rotatable relative to the sub-frame and around a vertical axis.

The palletizer according to the invention has two floors, such that two pieces of cargo can be held in the manipulator.

As soon as the piece of cargo is released from the first floor by opening the door, allowing the piece of cargo to fall through the opening in the first floor, the door in the second floor can be opened, while the door in the first floor is closed. As a result the piece of cargo from the second floor will fall to the first floor and can directly be rotated into the correct position.

The sub-frame does not need to return to a starting position for the second piece of cargo, but can move directly to the next position over the support surface. This increases the speed of the palletizer.

In a preferred embodiment of the palletizer according to the invention the door of the first and/or the second floor comprises two door panels slidable parallel to the horizontal plane away and towards each other to respectively open or close the opening in the first and/or the second floor.

The two door panels can be retracted simultaneously to open the opening in the floor. This ensures that the piece of cargo falls evenly to the next level, preventing any rotation around a horizontal axis as much as possible.

In another embodiment of the palletizer according to the invention two parallel upstanding side walls are arranged adjacent and opposite of the opening in the second floor.

The side walls ensure that the piece of cargo arriving from the supply main conveyor is sufficiently aligned with the opening in the second floor.

In a further preferred embodiment of the palletizer according to the invention two parallel upstanding guide walls are arranged adjacent and opposite of the opening in the first floor, wherein the two guide walls are movable in a direction perpendicular to the side walls for guiding and centering cargo above the opening in the first floor.

The guide walls provide a guide for the piece of cargo falling through the opening in the second floor onto the first floor. Furthermore, the guide walls can be moved such that the piece of cargo is positioned exactly on the door over the opening in the first floor. This ensures that when the door of the first floor is opened, the piece of cargo falls at the correct position in the layer on top of the pallet.

Still a further embodiment of the palletizer according to the invention further comprises secondary lift means arranged to the guide walls for lowering boxes through the opening in the first floor.

Boxes need to be guided more carefully than bags, for example to prevent the boxes from tipping over. By using the secondary lift means, the boxes can be lowered through the opening in the first floor and be positioned on top of a pallet.

In still a further embodiment of the palletizer according to the invention the secondary lift means comprise, arranged on each guide wall, a linear guide extending in vertical direction and a gripper movable along the linear guide.

Preferably, the gripper comprises a flange extending in a horizontal plane and a bar extending in a horizontal direction, which bar can be tilted into a position stowed into the respective guide wall.

The bar can be used to catch a box falling from the second floor to the first floor. The guide walls will prevent the box from tipping over. Then the guide walls are moved in contact with the box, such that the box is more or less clamped. The bars can then be stowed into the respective guide wall, leaving the box supported on the flanges. The flanges typically are smaller than the bars such that the boxes can be positioned in a layer on top of the pallet in a compact way.

In a further preferred embodiment of the palletizer according to the invention the manipulator further comprises:
  a supply sub conveyor arranged with one end adjacent to the one end of the supply main conveyor and arranged with the other end to the sub-frame and adjacent to the opening in the second floor, such that cargo is conveyed on top of the door closing the opening in the second floor.

The supply sub conveyor allows for the cargo to be supplied to the second floor, while another piece of cargo is still being positioned on the first floor. So, the sub-frame does not need to return to a starting position, but can be moved directly to a next position over the pallet. When the piece of cargo on the first floor is being positioned, another piece of cargo can already be supplied by the supply sub conveyor onto the second floor, waiting for the first floor to be empty again.

With this palletizer according to the invention virtually no time is wasted and the pieces of cargo can be positioned on the pallet, without the sub-frame needing to move back to a starting position.

Yet another embodiment of the palletizer according to the invention further comprises:
  pallet lifting means for lifting a pallet, which pallet lifting means are arranged to the main frame and are movable in vertical direction between the base of the main frame and the top of the main frame; and
  a pallet lifted by the pallet lifting means, which pallet forms the support surface.

With the pallet lifting means a formed layer of positioned cargo can be lowered and a next layer can be directly formed on top of the previous layer. Only when the pallet is fully packed with a number of layers, the pallet is to be transported to another location, while a next empty pallet is provided as a support surface.

BRIEF DESCRIPTION OF THE DRAWINGS

The terms FIG., FIGS., Figure, and Figures are used interchangeably in the specification to refer to the corresponding FIGS. in the drawings.

These and other features of the invention will be elucidated in conjunction with the accompanying drawings.

DESCRIPTION OF PREFERRED EMBODIMENTS

Figure 1:
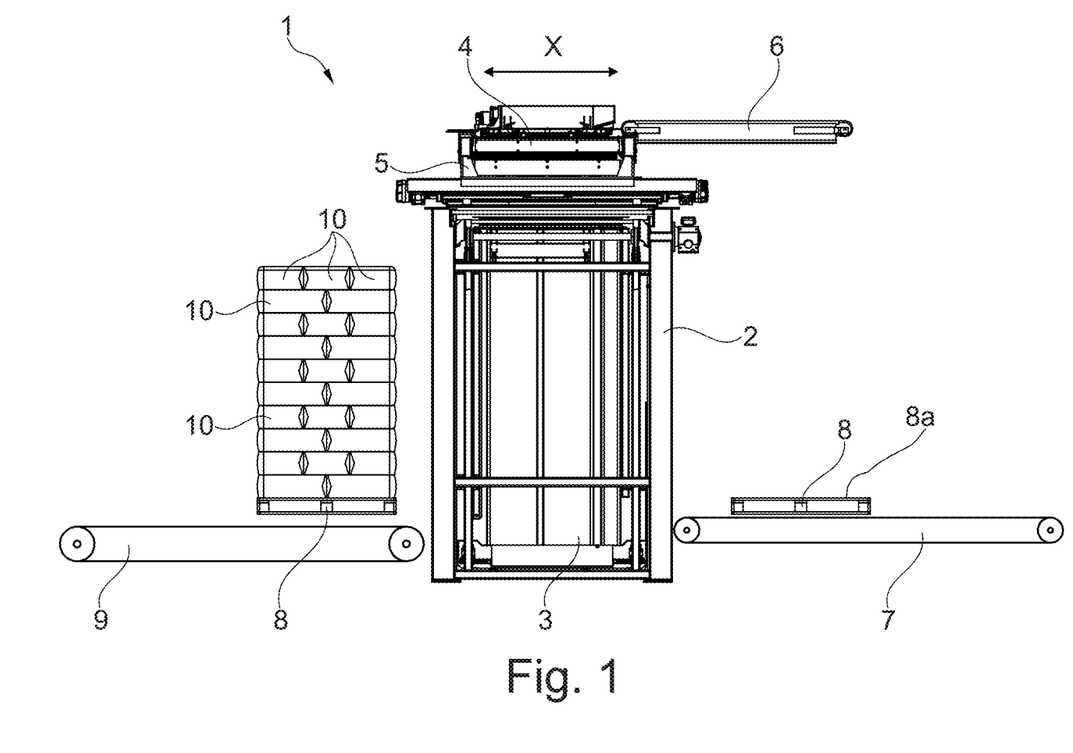
FIG. 1 shows a partially schematic side view of an embodiment of a palletizer according to the invention.

FIG. 1 shows a partially schematic side view of an embodiment of a palletizer 1 according to the invention. The palletizer 1 has a main frame 2 extending in vertical direction. A pallet lift 3 is arranged inside of the main frame 2 and manipulator 4 is arranged with its sub-frame 5 at the top of the main frame 2. The sub-frame 5 is movable in a horizontal plane in two main directions x, y.

A supply sub conveyor 6 is connected with one end to the sub-frame 5, such that cargo, such as bags and boxes, can be supplied from a main conveyor (not shown) onto the supply sub conveyor 6 and into the manipulator 4.

A pallet supply conveyor 7 is provided at the bottom next to the main frame 2 to supply a pallet 8 having a top surface 8a forming a support surface to the pallet lift 3. The pallet 8 is brought to the top of the main frame 2 such that the manipulator can position cargo in layers onto the pallet 8. When a layer is filled with bags or boxes, the pallet lift 3 is lowered over the height of one layer and then a next layer of cargo is provided.

When a pallet 8 is fully loaded with cargo, then the pallet 8 with bags 10 is unloaded from the pallet lift 3 onto a discharge conveyor 9.

Figure 2A:
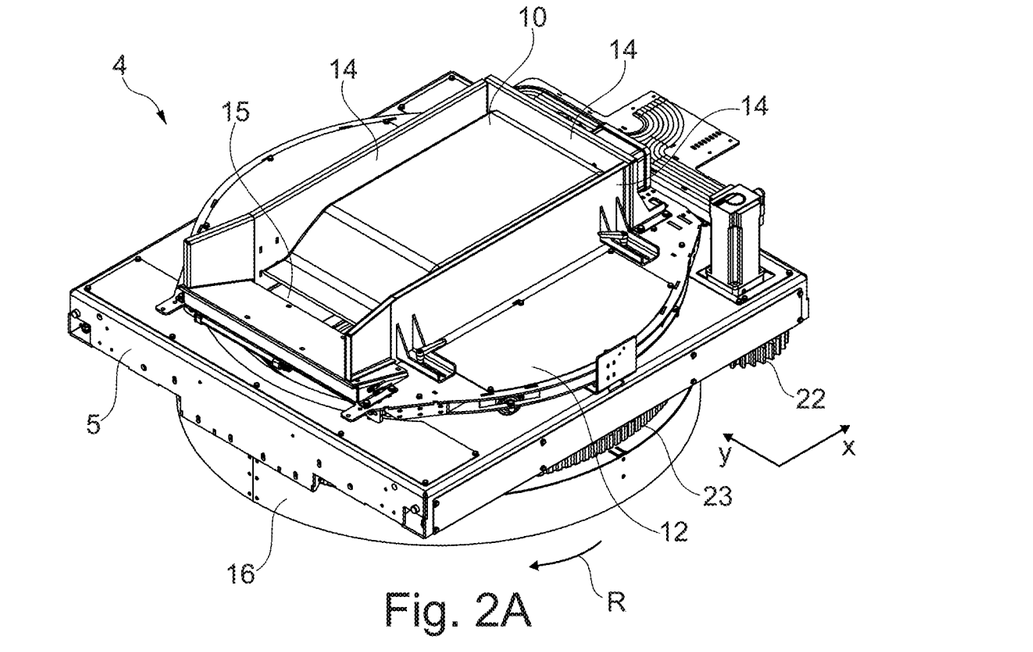
FIG. 2A shows a perspective view of the manipulator of the palletizer according to FIG. 1.

FIG. 2A shows the manipulator 4 in perspective view and in more detail. The sub-frame 5 of the manipulator 4 can be moved in both x-direction and y-direction over the pallet 8 in the pallet lift 3.

The manipulator 4 has a first floor 16 with an opening 17. A trap door 18 is arranged against the bottom of the first floor. The opening 17 is bordered by upstanding walls 19, 20, which a movable towards and away from each other.

Figure 2B:
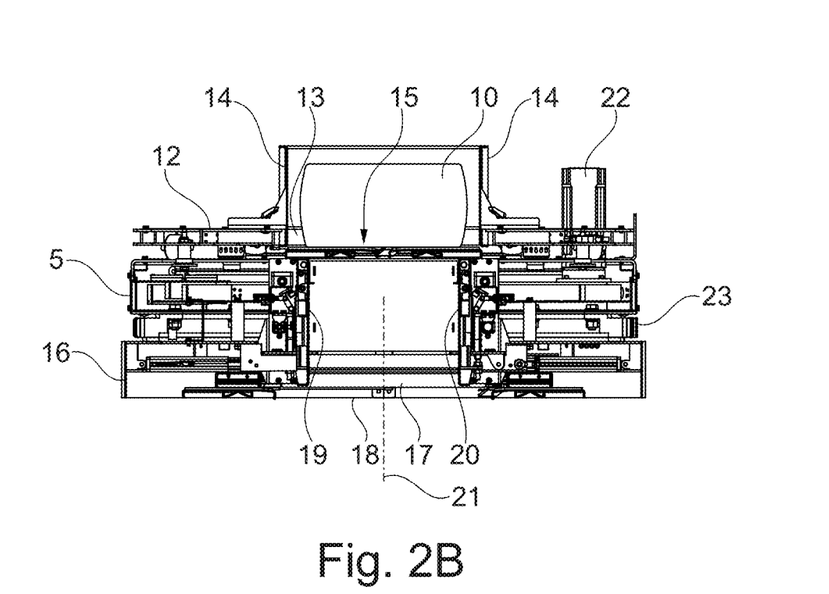
FIG. 2B shows a cross-sectional view of the manipulator according to FIG. 2A.

A second floor 12 with an opening 13 bordered by upstanding guide plates 14 is arranged over the first floor 16. A trap door 15 is arranged against the bottom of the first floor 12 to close or open the opening 13. A bag 10 is shown in FIGS. 2A and 2B to be positioned between the guide plates 14 and on top of the trap door 15.

The first floor 16 is rotatable around a vertical axis 21 in a direction R. The rotation is caused by a motor 22 which engages onto a toothed edge 23 provided on the first floor 16.

Figure 3A:
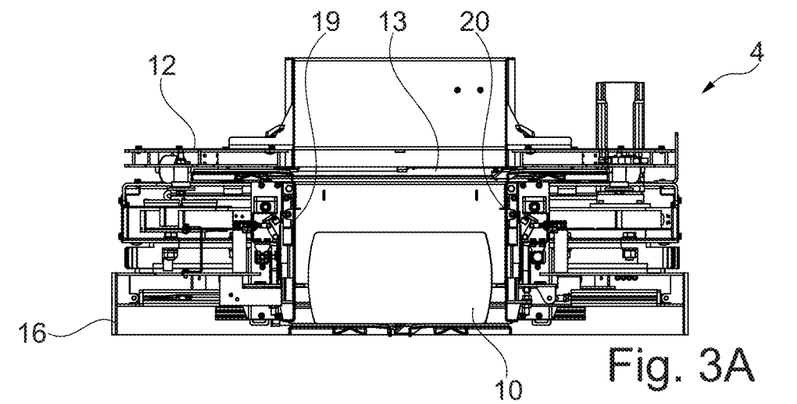
FIGS. 3A-3C show a cross-sectional view of the manipulator in a first mode according to FIG. 2A in different handling positions for a bag.
Figure 3B:
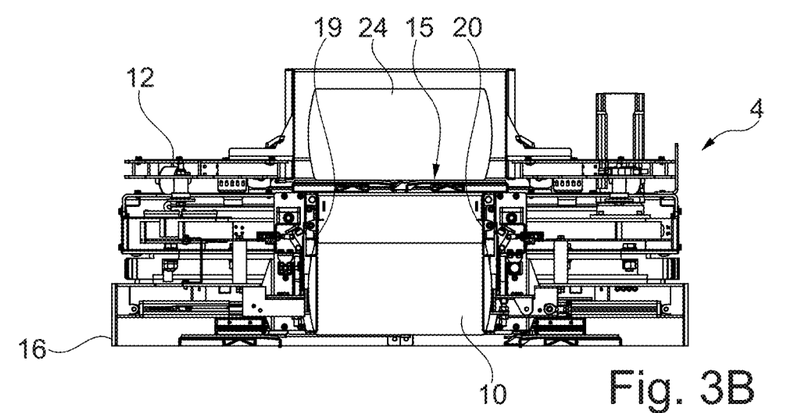
Figure 3C:
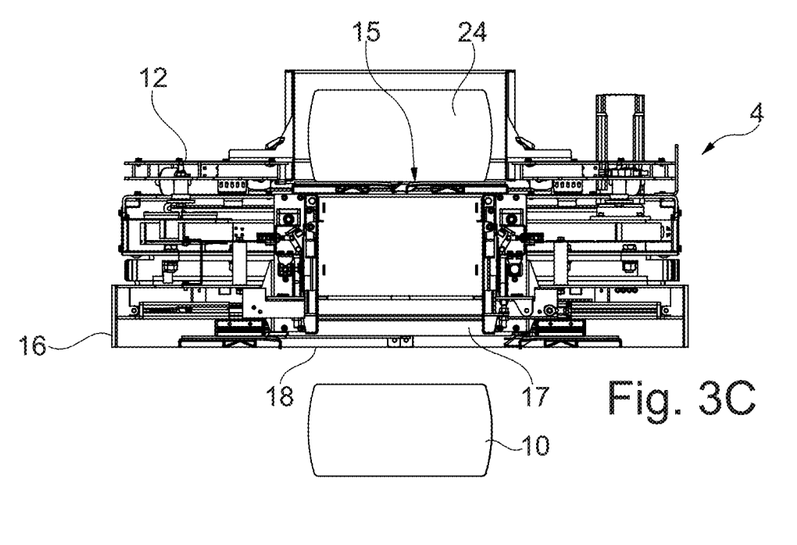

FIGS. 3A-3C show the manipulator 4 in different handling positions, in which the bag 10 is moved from the second floor 12 to a layer on top of a pallet 8 arranged in the pallet lift 3.

In FIG. 3A the upstanding walls 19, 20 are moved away from each other. Then the trapdoor 15 is opened, such that the bag 10 can fall from the second floor 12 on top of the trap door 18 of the first floor 16. In FIG. 3B the trapdoor 15 is closed again, such that a second bag 24 can be supplied again to the second floor 12. In the meantime the first bag 10 is centered onto the first floor 16 by moving the upstanding walls 19, 20 towards each other.

In FIG. 3C the trapdoor 18 is opened such that the bag 10 can fall through the opening 17 and on top of the pallet 8 arranged in the pallet lift 3. As soon as the bag 10 has left the manipulator 4, the trapdoor 18 is closed again and the steps of FIG. 3A-3B can be repeated.

The sub-frame 5 of the manipulator can be moved in both x-direction and y-direction to a position over the pallet 8 in the pallet lift 3, as long as the trapdoor 18 is closed.

Figure 4A:
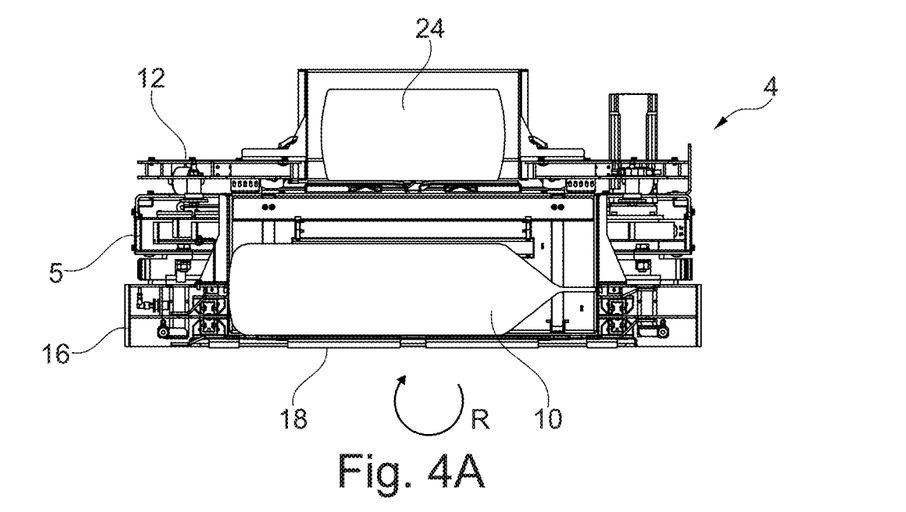
FIGS. 4A and 4B show a cross-sectional view of the manipulator in a second mode according to FIG. 2A in different handling positions for a bag.
Figure 4B:
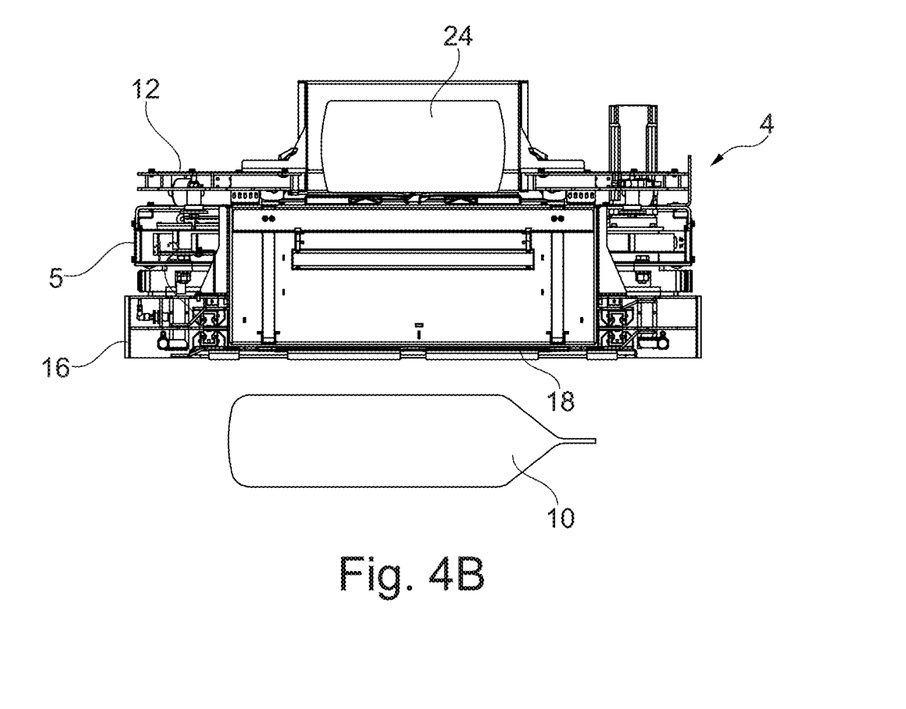

FIGS. 4A and 4B show the manipulator 4 shown in FIGS. 2A and 2B in a second mode. As soon as a bag 10 has fallen from the second floor 12 onto the trapdoor 18 of the first floor 16, the first floor 16 is rotated relative to the sub-frame 5. This allows for the bag 10 to be oriented in the correct position, such that a layer of bags onto the pallet could be provide in a desired pattern.

When the rotation is completed and the manipulator is moved to the correct position over the pallet, the bag 10 can be released by opening the trapdoor 18, as shown in FIG. 4B.

FIGS. 5A-5D shows the manipulator 4 shown in FIGS. 2A and 2B in a third mode, wherein the manipulator handles boxes 30.

Figure 5A:
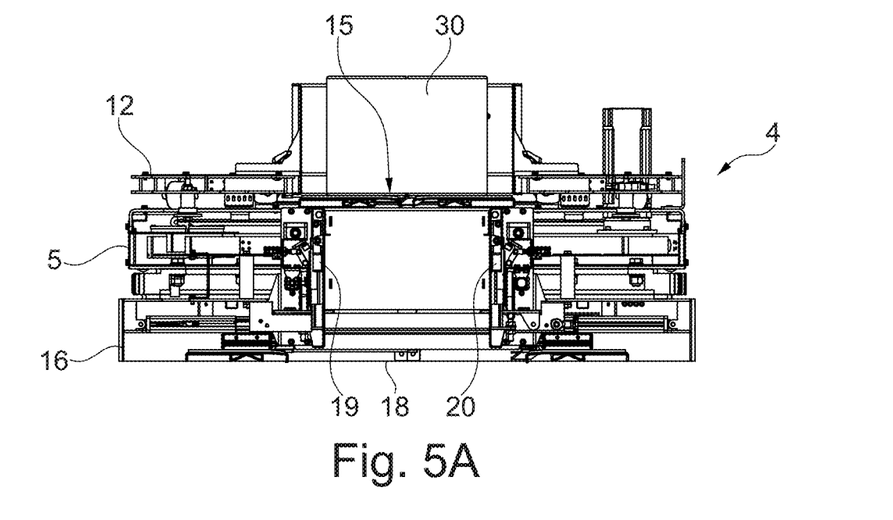
FIG. 5A-5D show a cross-sectional view of the manipulator in a third mode according to FIG. 2A in different handling positions for a box.

In FIG. 5A a box 30 is supplied on top of the trapdoor 15 of the second floor 12.

Figure 5B:
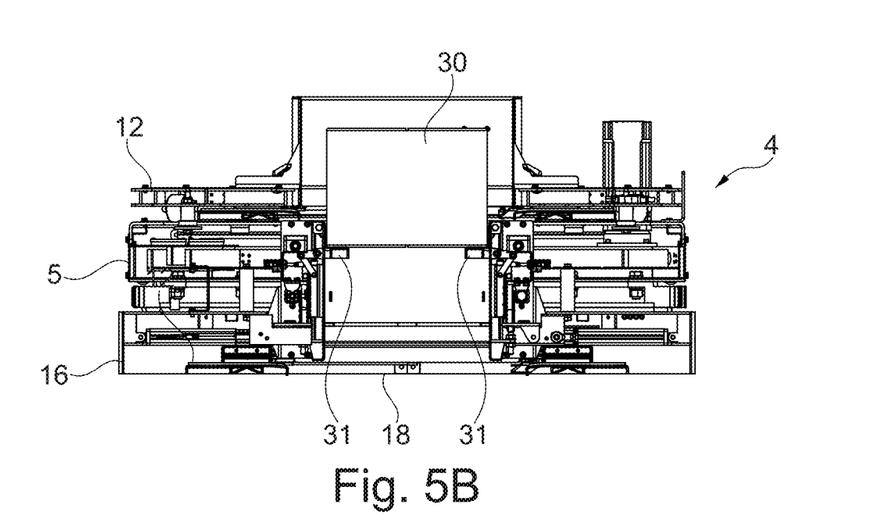

In FIG. 5B the trapdoor 15 is opened, but in order to prevent the box 30 to fall onto the first floor 16, which could damage the content of the box 30, a secondary lift is provided in the walls 19, 20. The secondary lift has bars 31, which can be tilted from a position stowed into the respective walls 19, 20 towards a position extending into the fall path of the box 30.

The walls 19, 20 are then moved towards each other to hold the box 30 by friction, where after the bars 31 are moved back into the stowed position. The box 30 will then slide along the walls 19, 20 to the first floor 16 on top of the trapdoor 18.

Figure 5C:
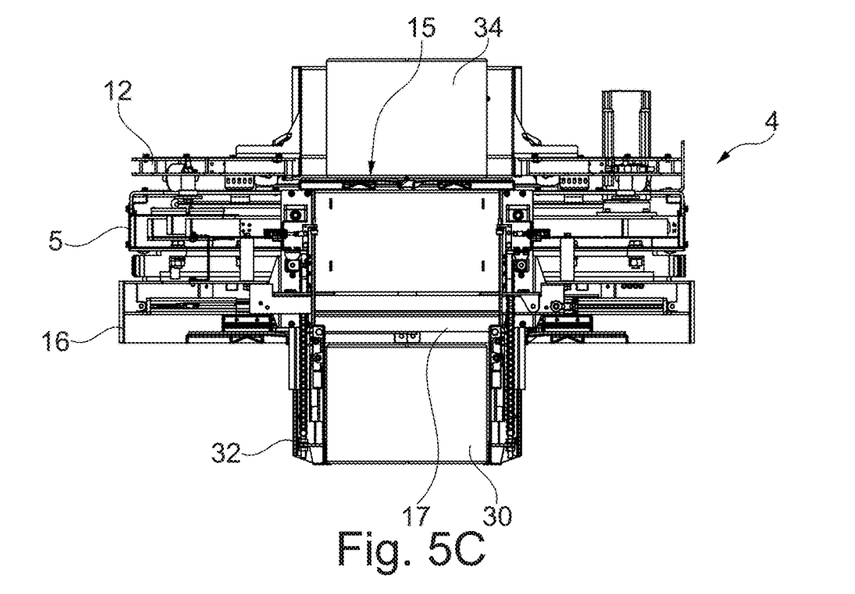
Figure 5D:
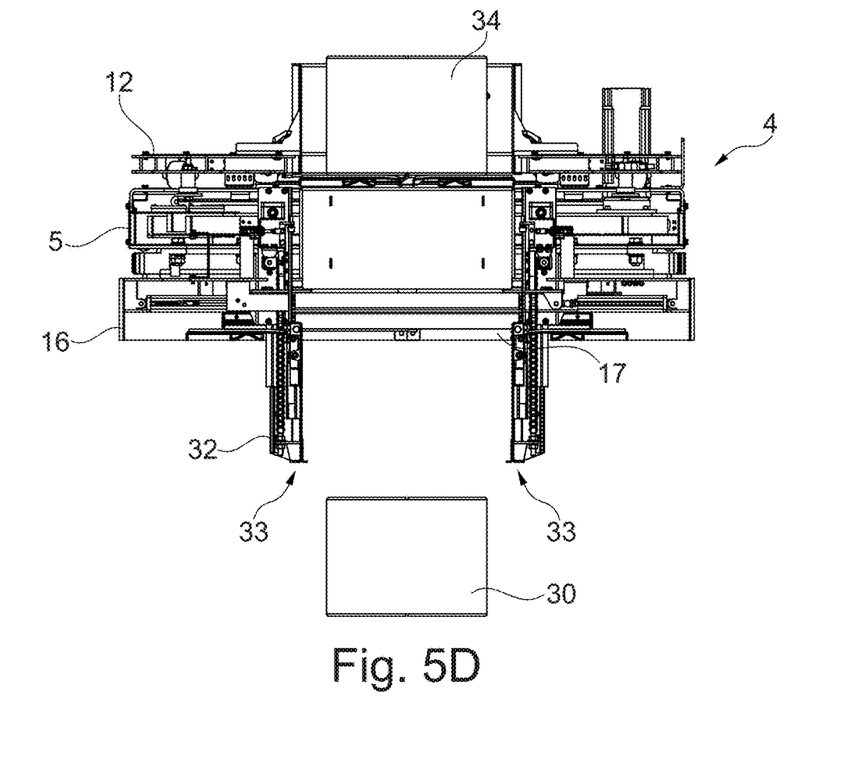

Shown in FIG. 5C, the secondary lift has a linear guide with a gripper 32 provided at the bottom with an edge 33 on which the box 30 is supported (see also FIG. 5D). After opening the trapdoor 18, the gripper 32 holding the box 30 is lowered through the opening 17 in the first floor 16 and then the box 30 is positioned onto the top of the pallet 8 in the pallet lift 3.

In FIG. 5C the box 30 is released from the gripper 32 by moving the walls 19, 20 away from each other. After which the gripper 32 is lifted up to above the first floor 16, such that a next box 34 can be handled.

The invention claimed is:

1. A palletizer for stacking cargo, such as bags or boxes, onto a pallet in multiple layers, which palletizer comprises:
   a main frame extending in vertical direction;
   a support surface arranged to the main frame;
   a manipulator arranged to the top of the main frame for positioning the cargo and forming a layer on top of the support surface; and
   a supply main conveyor, such as a belt conveyor, arranged with one end to the top of the main frame for supplying cargo to the manipulator;
   wherein the manipulator comprises:
   a sub-frame movable in a horizontal plane relative to the top of the main frame;
   wherein the manipulator further comprises:
   a first floor arranged in the sub-frame and a second floor arranged in the sub-frame and above the first floor, wherein each floor has an opening, which can be closed by a door, such as a trap door, and wherein the openings in the floors are aligned when viewed in a vertical direction;
   wherein the first floor is rotatable relative to the sub-frame and around a vertical axis.

2. The palletizer according to claim 1, wherein the door of the first and/or the second floor comprises two door panels slidable parallel to the horizontal plane away and towards each other to respectively open or close the opening in the first and/or the second floor.

3. The palletizer according to claim 1, wherein two parallel upstanding side walls are arranged adjacent and opposite of the opening in the second floor.

4. The palletizer according to claim 1, wherein two parallel upstanding guide walls are arranged adjacent and opposite of the opening in the first floor, wherein the two guide walls are movable in a direction perpendicular to the side walls for guiding and centering cargo above the opening in the first floor.

5. The palletizer according to claim 4, further comprising secondary lift means arranged to the guide walls for lowering boxes through the opening in the first floor.

6. The palletizer according to claim 5, wherein the secondary lift means comprise, arranged on each guide wall, a linear guide extending in vertical direction and a gripper movable along the linear guide.

7. The palletizer according to claim 6, wherein the gripper comprises a flange extending in a horizontal plane and a bar extending in a horizontal direction, which bar can be tilted into a position stowed into the respective guide wall.

8. The palletizer according to claim 1, wherein the manipulator further comprises:
   a supply sub conveyor arranged with one end adjacent to the one end of the supply main conveyor and arranged with the other end to the sub-frame and adjacent to the opening in the second floor, such that cargo is conveyed on top of the door closing the opening in the second floor.

9. The palletizer according to claim 1, further comprising:
   a pallet lifting means for lifting a pallet, which pallet lifting means are arranged to the main frame and are movable in vertical direction between the base of the main frame and the top of the main frame; and
   a pallet lifted by the pallet lifting means, which pallet forms the support surface.

* * * * *